(12) United States Patent
Sheridon

(10) Patent No.: US 7,432,942 B2
(45) Date of Patent: Oct. 7, 2008

(54) ELECTRIC DISPLAY MEDIA

(75) Inventor: Nicholas K Sheridon, Los Altos, CA (US)

(73) Assignee: Xerox Corporation, Norwalk, CT (US)

( * ) Notice: Subject to any disclaimer, the term of this patent is extended or adjusted under 35 U.S.C. 154(b) by 279 days.

(21) Appl. No.: 11/211,533

(22) Filed: Aug. 26, 2005

(65) Prior Publication Data

US 2007/0047062 A1    Mar. 1, 2007

(51) Int. Cl.
*B41J 2/41* (2006.01)
*G02B 26/00* (2006.01)

(52) U.S. Cl. .................. 347/112; 347/115; 359/296

(58) Field of Classification Search .................. 347/112, 347/115; 359/296
See application file for complete search history.

(56) References Cited

U.S. PATENT DOCUMENTS

| 5,389,945 A | 2/1995 | Sheridon |
| 5,604,027 A | 2/1997 | Sheridon |
| 5,723,204 A | 3/1998 | Stefik |
| 6,211,998 B1 * | 4/2001 | Sheridon .................. 359/296 |
| 6,518,949 B2 | 2/2003 | Drzaic |

* cited by examiner

*Primary Examiner*—Evelyn A. Lester
(74) *Attorney, Agent, or Firm*—Pillsbury Winthrop Shaw Pittman LLP

(57) ABSTRACT

A visual display system and a method for displaying information. The information displayed on the visual display system may be substantially or entirely immune to stray electric fields.

6 Claims, 4 Drawing Sheets

ELECTRIC DISPLAY MEDIA

BACKGROUND

Disclosed is a visual display system and a method for displaying information. The information displayed on the visual display system may be substantially or entirely immune to stray electric fields.

Traditional signs have been based upon printed materials, paper, plastic, metal, etc., and are therefore not programmable. Accordingly, they are not easily changed. In an attempt to overcome this problem, electronically programmable and/or controllable signs have been developed. For example, liquid crystal diode (LCD) displays, cathode ray tube (CRT) displays, and other electrically-addressable displays will display an image in response to applied electric signals or fields. However, such signs typically require a large amount of electricity, since they must provide illumination in order to be visible to a viewer.

Other types of electric writeable media known as rotatable element displays or electric paper displays also exist. One example of a rotatable element display includes a polymer substrate and bichromal rotatable elements such as balls or cylinders that are in suspension with an enabling fluid and are one color, such as white, on one side and a different color, such as black, on the other. Examples of such rotatable element displays are described, for example, in U.S. Pat. No. 5,723,204 to Stefik and U.S. Pat. No. 5,604,027 to Sheridon, each of which is incorporated herein by reference in its entirety. Under the influence of an electric field, the elements rotate so that either the white side or the black side is exposed.

Another type of electric writeable media is known as an electronic ink display, such as the one described in U.S. Pat. No. 6,518,949 to Drzaic, which is incorporated herein by reference. An electronic ink display includes at least one capsule filled with a plurality of particles, made of a material such as titania, and a suspending fluid containing dye. When a direct-current electric field of an appropriate polarity is applied across the capsule, the particles move to a viewed surface of the display and scatter light. When the applied electric field is reversed, the particles move to the rear surface of the display and the viewed surface of the display then appears dark.

Yet another type of electric writeable media, also described in U.S. Pat. No. 6,518,949 to Drzaic, includes a first set of particles and a second set of particles in a capsule. The first set of particles and the second set of particles have contrasting optical properties, such as contrasting colors, and can have, for example, differing electrophoretic properties. The capsule also contains a substantially clear fluid. The capsule has electrodes disposed adjacent to it connected to a voltage source, which may provide an alternating-current field or a direct-current field to the capsule. Upon application of an electric field across the electrodes, the first set of particles move toward one electrode, while the second set of particles move toward the second electrode.

Other examples of writeable media include liquid crystal diode displays, encapsulated electrophoretic displays, and other displays.

Rotatable element displays have numerous advantages over conventional displays, such as LCDs and CRTs, since they are suitable for viewing in ambient light, they retain an image for long periods of time in the absence of an applied electric field, and they can be made to be very lightweight and/or flexible. For further advantages of such displays, see U.S. Pat. No. 5,389,945 to Sheridon, incorporated herein by reference in its entirety. An example of such a display is a SmartPaper™ display from Gyricon LLC.

FIG. 1 depicts the switching behavior of electric paper. The electric paper includes a plurality of rotatable elements, such as bichromal balls. The bichromal balls (10) have a first-colored hemisphere (12), such as black, and a second-colored hemisphere (14), such as white. Typically, the black hemisphere (12) is positively charged and the white hemisphere (14) is negatively charged. As such, the bichromal ball has an electrical dipole charge that causes it to rotate upon the application of an external electric field.

In bichromal balls, the charge of one hemisphere is often greater magnitude than the charge of the other hemisphere. Thus, each bichromal ball has an electrical monopole charge, which is defined as the algebraic sum of the hemispherical charges. The electrical monopole charge permits a ball to move across the cavity (14) when an external electric field is applied.

During quiescent periods, a combination of electrical, hydraulic and mechanical forces may attach a bichromal ball to a wall (e.g., 16, 16') of a cavity in which it resides. The electrical monopole charge causes the bichromal ball to separate from a cavity wall (e.g., 16) and move to the opposite cavity wall (e.g., 16') in the presence of an external electric field. Once free from the cavity wall, the electrical dipole charge interacts with the external electric field to cause the bichromal ball to rotate into alignment with the electric field. When the bichromal ball reaches the opposite cavity wall (e.g., 16'), it attaches to the wall and rotation ceases. Accordingly, the electrical monopole charge has been recognized as a component in prior art electric paper switching behavior.

One disadvantage of electric paper displays is that they may be subject to stray electric fields, such as those caused by static electricity generated from handling papers or walking across carpets. Such stray electric fields, when generated proximate to electric paper, may cause rotatable elements within the electric paper to rotate, or other bichromal media to change, unintentionally. As a result, the image displayed on the electric paper may become corrupted.

As such, a need exists to improve electric displays, such as electric paper, by disabling the effects of stray electric fields upon changeable bichromal display media in the electric display.

SUMMARY

It is to be understood that this invention is not limited to the particular methodologies, systems and materials described herein, as these may vary. It is also to be understood that the terminology used in the description is for the purpose of describing the particular versions or embodiments only, and is not intended to limit the scope of the present invention. All publications mentioned herein are incorporated by reference. Nothing herein is to be construed as an admission that the invention is not entitled to antedate such disclosure by virtue of prior invention.

It must also be noted that as used herein and in the appended claims, the singular forms "a," "an," and "the" include plural references unless the context clearly dictates otherwise. Thus, for example, reference to a "rotatable element" is a reference to one or more rotatable elements and equivalents thereof known to those skilled in the art, and so forth. Unless defined otherwise, all technical and scientific terms used herein have the same meanings as commonly understood by one of ordinary skill in the art. Although any methods, materials, and devices similar or equivalent to those described herein can be used in the practice or testing of embodiments of the present invention, the preferred methods, materials, and devices are now described.

The methods and systems described herein relate to the manufacture and use of electric paper the display of which is shielded from stray electric fields.

In an embodiment, electric paper includes a substrate, a plurality of cavities within the substrate, and display element(s) such as a plurality of rotatable elements. Each display element, which may be rotatable, may be located within a corresponding cavity and have an electrical monopole charge that is substantially equal to zero. Each display element may further include a first segment and a second segment. The first segment may include a super-paramagnetic pigment and have a first color, wherein the second segment may have a second color.

In an embodiment, a method of printing on electric paper includes generating an electric field and magnetic field at a position on the electric paper, permitting a rotatable element within the electric paper to rotate, disabling the magnetic field, and disabling the electric field.

In an another embodiment, a method of printing on electric paper includes generating an electric field at a position on the electric paper, generating a magnetic field at the position, permitting a changing element of a bichromal medium within the electric paper to change, disabling the magnetic field and disabling the electric field.

In an embodiment, an apparatus for printing on electric paper includes a first magnetic device, a second magnetic device positioned such that the distance between the first magnetic device and the second magnetic device is sufficient to permit a sheet of electric paper to be placed between the first magnetic device and the second magnetic device, and one or more electronic circuits. In this embodiment, each electronic circuit includes one or more electrodes and is located within either or both the first magnetic device or the second magnetic device.

In an embodiment, electric paper includes a substrate, a plurality of cavities within the substrate, and a plurality of changing elements of a multichromal media. One or more changing elements are located within a cavity. In this embodiment, the sum of the electrical monopole charges of the changing elements within a cavity is substantially equal to zero. The changing elements within a cavity may further include a first segment and a second segment. The first segment of the changing elements may include a super-paramagnetic material.

In an embodiment, a method of printing on electric paper includes generating a localized electric field at a position on electric paper, generating a magnetic field at the position, permitting a changing element of a multichromal media located at the position to change in response to the magnetic field and the localized electric field, disabling the magnetic field, and disabling the electric field.

BRIEF DESCRIPTION OF THE DRAWINGS

Aspects, features, benefits and advantages of the embodiments of the present invention will be apparent with regard to the following description and the accompanying drawings where.

DETAILED DESCRIPTION

In an embodiment, electric paper includes rotatable elements composed of two segments. The first segment of a rotatable element may possess an electric charge that is substantially equal in magnitude and opposite in polarity to an electric charge of the second segment of the rotatable element. As such, each rotatable element may have an electrical monopole charge substantially equal to zero. Alternate embodiments may include more than two segments for each rotatable element. However, the rotatable element of these embodiments may also possess an electrical monopole charge substantially equal to zero.

Optionally, a magnetic field may be applied to electric paper in addition to the electric field used to address rotatable elements in order to rotate the rotatable elements. The magnetic field may be used to detach rotatable elements from cavity walls and permit the image-wise rotation of the rotatable elements.

Alternatively, the electric paper may include changing elements of multichromal media such as pigments, dyes, pigment dispersions, dye solutions, or any other changing elements that are activated at least in part by the application of an electric field. In one embodiment, the changing elements may not detach from cavity walls in the absence of a magnetic field.

Figure 1:
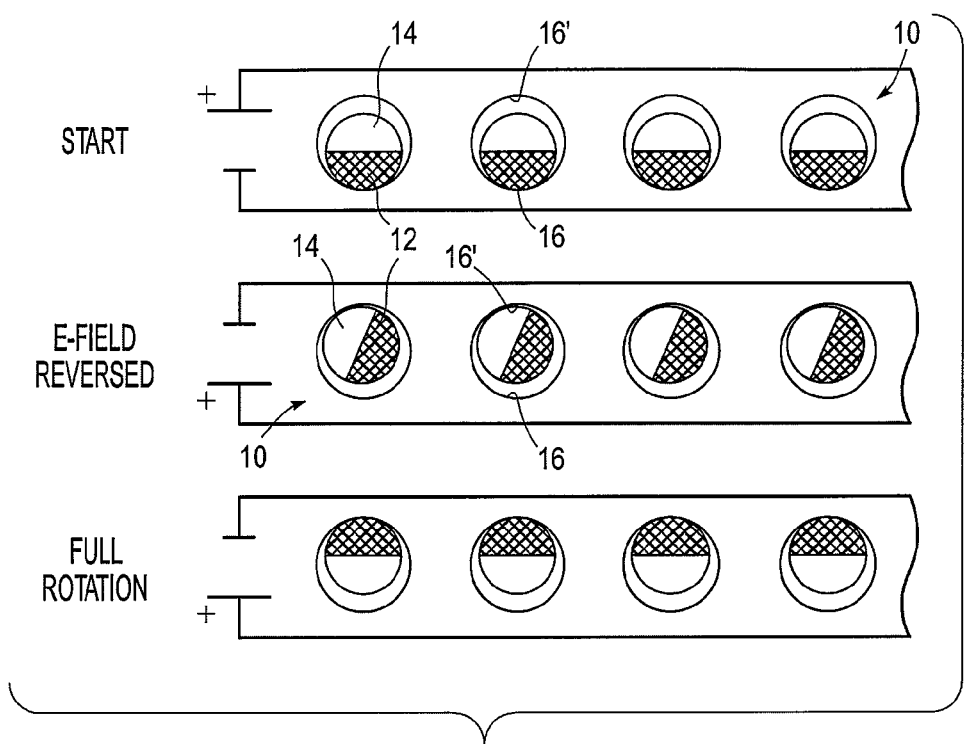
FIG. 1 depicts the switching behavior of prior art electric paper.
Figure 2:
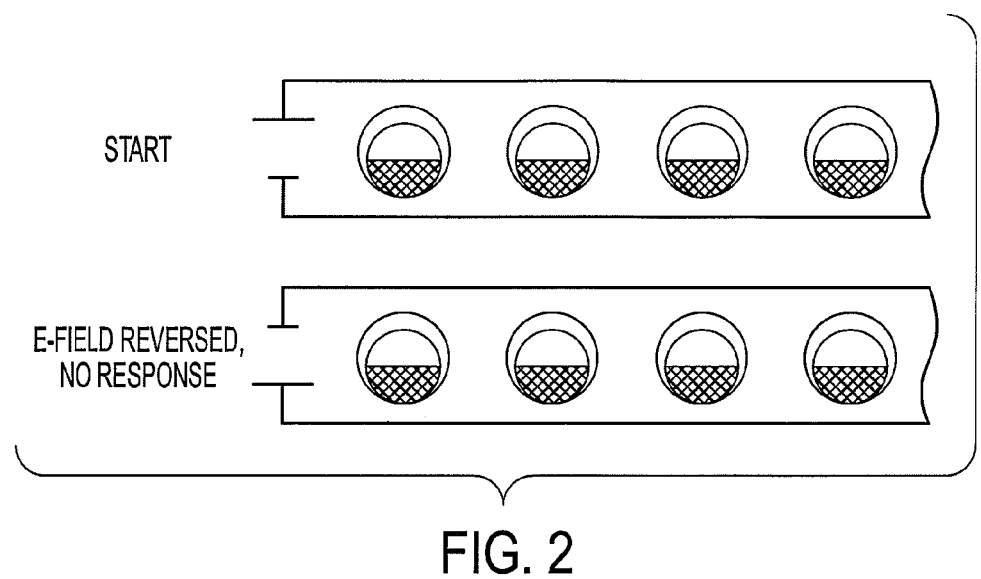
FIG. 2 illustrates an exemplary switching behavior in the presence of an applied electric field with no applied magnetic field.

FIG. 2 illustrates an exemplary switching behavior of electric paper in the presence of an applied electric field with no applied magnetic field. In a preferred embodiment, rotatable elements include segments containing charges of equal magnitude and opposite polarity (i.e., the rotatable elements have substantially no electrical monopole charge). Such rotatable elements may not respond to the application of an external electric field of either polarity or of any magnitude.

One segment, such as a white-colored segment, of a rotatable element may include, for example, a titanium oxide pigment. The pigment may be added to the base resin for the segment of the rotatable element. A second segment, such as a black-colored segment, may include one or more of a variety of colored pigments, such as carbon black. In an embodiment, the second segment includes a pigment possessing super-paramagnetic properties, such as the Ferro 6331 pigment. A super-paramagnetic material may behave similar to a ferromagnetic material when an external electric field is applied. However, when no electric field is applied, the super-paramagnetic material may not possess any magnetic orientation. The super-paramagnetic pigment may be added to the base resin of the second segment for a rotatable element of the present invention.

In an alternate embodiment, the first segment of the rotatable element may include a super-paramagnetic pigment in addition to or in place of the super-paramagnetic pigment in the second segment of the rotatable element.

Figure 3A:
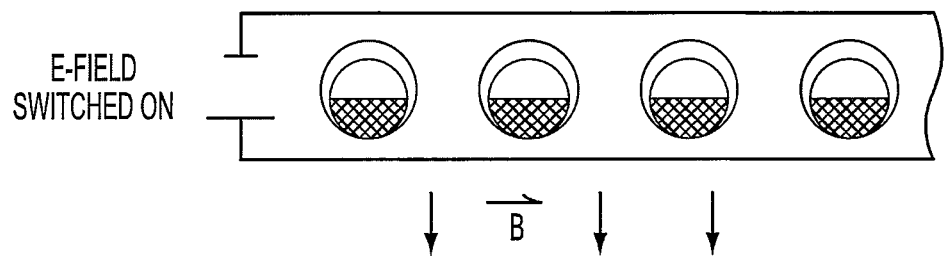
FIG. 3 shows an exemplary switching behavior in the presence of both an applied electric field and an applied magnetic field.
Figure 3B:
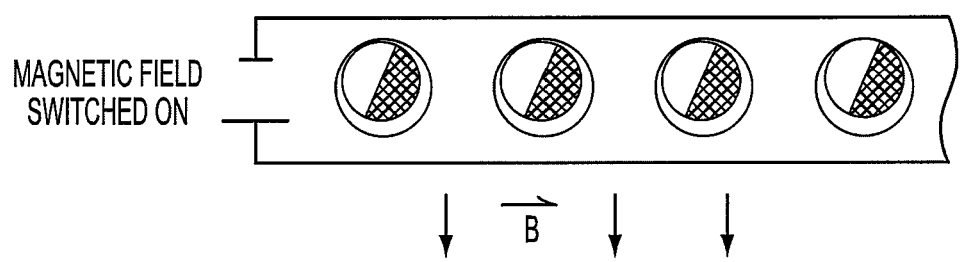
Figure 3C:
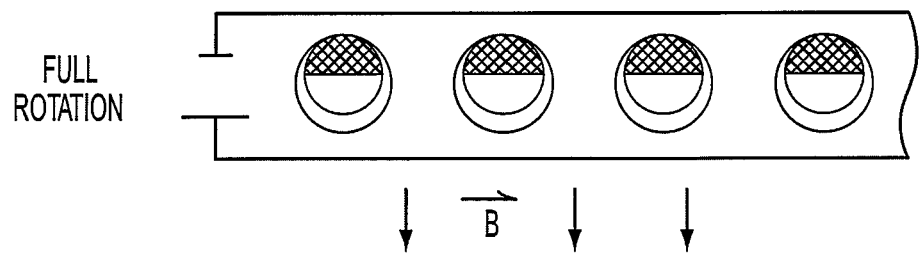

FIG. 3 shows an exemplary switching behavior of electric paper in the presence of both an applied electric field and an applied magnetic field. FIG. 3 illustrates exemplary behavior of rotatable elements with substantially no electrical monopole charge in which at least one segment includes a super-paramagnetic material. In FIG. 3a, an external electric field is applied to one or more rotatable elements. The one or more rotatable elements may not respond to the electric field because each rotatable element has substantially no electrical monopole charge. In FIG. 3b, an external magnetic field B may be applied in the vicinity of the rotatable elements. The external magnetic field B may induce a magnetic dipole moment in one or more segments of the rotatable elements including the super-paramagnetic material. The magnetic dipole may interact with the external magnetic field to exert a force that causes one or more of the rotatable elements to move away from the cavity wall to which they are attached and toward the opposite wall of the cavity. Once freed from the cavity wall, the electrical dipole charge of the rotatable elements may cause rotatable elements in proximity to an electric field to rotate. Upon reaching the opposite cavity wall, each rotatable element may attach to the wall and cease rotating. The magnetic field may be applied for a sufficient period of time to allow the one or more rotatable elements to move across the cavity and attach to the opposite cavity wall.

The magnetic dipole induced by the external magnetic field opposes the rotation of a rotatable element, which is induced by the external electric field. Accordingly, in an embodiment the required electric field may be greater than the electric field required by prior art electric paper in order for the rotatable element to complete 180 degrees of rotation during separation from the cavity wall. Alternatively, the magnetic field may be disabled after the rotatable element is first released from its cavity wall and re-enabled after the electric field has completed rotation of the rotatable element.

Figure 4:
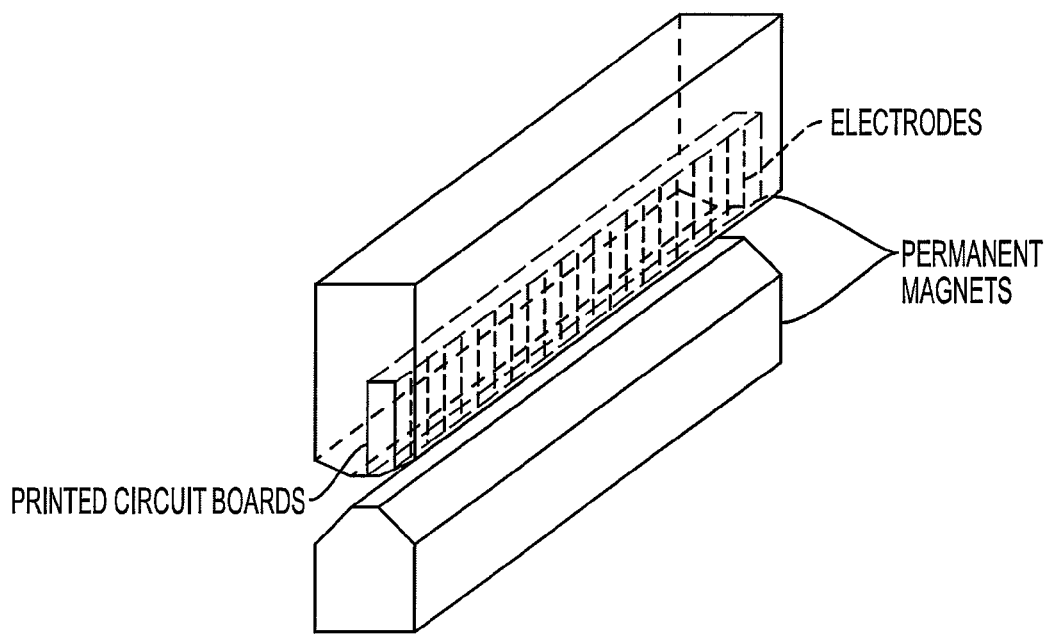
FIG. 4 depicts an exemplary writing head.

FIG. 4 depicts an exemplary printing head for electric paper. The electric paper printing head may contain magnets that generate the magnetic field according to the methods described in reference to FIG. 3. Permanent magnets may be used to supply the magnetic field. Alternatively, electromagnets or other non-permanent magnets may be used to generate the magnetic field. The electric paper printing head may also contain a plurality of electrodes for supplying the electric field across the electric paper. The number of electrodes may be selected based upon the number of "pixels" that are placed in a horizontal direction across a sheet of electric paper.

In order to print on a sheet of electric paper, the paper may be drawn through the electric paper printing head in a direction at a known rate such that substantially all of the electric paper passes through the printing head during the electric paper printing process. Electrodes corresponding to pixels may be engaged when the portion of the electric paper passing through the printing head is to be written. The magnetic field may be applied simultaneously in order to detach rotatable elements from their cavity walls and to permit their rotation. In an alternative embodiment, the electric paper printing head may be in the form of a wand or stylus (not shown).

Although the invention has been described with reference to the preferred embodiments, it will be apparent to one skilled in the art that variations and modifications are contemplated within the spirit and scope of the invention. The drawings and description of the preferred embodiments are made by way of example rather than to limit the scope of the invention, and it is intended to cover within the spirit and scope of the invention all such changes and modifications.

The invention claimed is:

1. A method of printing on electric paper, comprising:
   locating a sheet of electric paper between a first magnetic device and a second magnetic device;
   generating a localized electric field at a position on the electric paper using one or more electrodes located within one of the first magnetic device or the second magnetic device;
   generating a magnetic field at the position;
   permitting a rotatable element located at the position to rotate in response to the magnetic field and the localized electric field;
   disabling the magnetic field; and
   disabling the electric field.

2. An apparatus for printing on electric paper, comprising:
   a first magnetic device;
   a second magnetic device positioned such that the distance between the first magnetic device and the second magnetic device is sufficient to permit a sheet of electric paper to be placed between the first magnetic device and the second magnetic devices,
   wherein the first magnetic device and the second magnetic device are configured to generate a magnetic field at a position on the electric paper; and
   one or more electrodes located within one of the first magnetic device or the second magnetic device configured to generate a localized electric field at the position on the electric paper.

3. The apparatus of claim 2 further comprising at least one circuit board located within one of the first magnetic device or the second magnetic device, wherein the at least one circuit board contains the one or more electrodes.

4. The apparatus of claim 2 wherein the first and second magnetic devices are permanent magnets.

5. The apparatus of claim 2 wherein the first and second magnetic devices are non-permanent magnets.

6. A method of printing on electric paper, comprising:
   locating a sheet of electric paper between a first magnetic device and a second magnetic device;
   generating a localized electric field at a position on the electric paper using one or more electrodes located within one of the first magnetic device or the second magnetic device;
   generating a magnetic field at the position;
   permitting a changing element of a multichromal media located at the position to change in response to the magnetic field and the localized electric field;
   disabling the magnetic field; and
   disabling the electric field.

* * * * *